US011461676B2

(12) United States Patent
Thakkar et al.

(10) Patent No.: US 11,461,676 B2
(45) Date of Patent: Oct. 4, 2022

(54) MACHINE LEARNING-BASED RECOMMENDATION ENGINE FOR STORAGE SYSTEM USAGE WITHIN AN ENTERPRISE (71) Applicant: EMC IP Holding Company LLC, Hopkinton, MA (US)

(72) Inventors: Bina K. Thakkar, Cary, NC (US); Roopa A. Luktuke, Morrisville, NC (US); Chao Su, Cary, NC (US); Aditya Krishnan, Cary, NC (US); Deepak Gowda, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 652 days.

(21) Appl. No.: 16/527,253

(22) Filed: Jul. 31, 2019

(65) Prior Publication Data
US 2021/0034991 A1 Feb. 4, 2021

(51) Int. Cl.
*H04L 67/1097* (2022.01)
*G06N 5/04* (2006.01)
*G06F 3/06* (2006.01)
*G06N 20/00* (2019.01)

(52) U.S. Cl.
CPC ............ *G06N 5/04* (2013.01); *G06F 3/0604* (2013.01); *G06F 3/067* (2013.01); *G06F 3/0632* (2013.01); *G06N 5/046* (2013.01); *G06N 20/00* (2019.01); *H04L 67/1097* (2013.01)

(58) Field of Classification Search
None
See application file for complete search history.

(56) References Cited

U.S. PATENT DOCUMENTS

| 9,043,279 | B1 | 5/2015 | Yucel et al. |
| 9,477,407 | B1* | 10/2016 | Marshak .................. G06F 3/061 |
| 9,778,927 | B2 | 10/2017 | Uchiyama |
| 10,073,858 | B2 | 9/2018 | Baranowsky |
| 10,348,562 | B2 | 7/2019 | Radhakrishnan et al. |
| 10,552,888 | B1* | 2/2020 | Aristides ............ G06Q 30/0631 |

(Continued)

OTHER PUBLICATIONS

Dell EMC, CloudIQ Detailed Review, White Paper, Oct. 2018.

(Continued)

*Primary Examiner* — Jeffrey R Swearingen
(74) *Attorney, Agent, or Firm* — Ryan, Mason & Lewis, LLP (57) ABSTRACT

Methods, apparatus, and processor-readable storage media for implementing a machine learning-based recommendation engine for storage system usage within an enterprise are provided herein. An example computer-implemented method includes processing input data pertaining to multiple storage systems within an enterprise; determining association rules applicable to the multiple storage systems by applying machine learning techniques to the processed input data; generating configuration-related recommendations applicable to one or more of the storage systems by applying content filtering techniques to the determined association rules; and outputting, via user interfaces, the configuration-related recommendations to a user for use in connection with storage system configuration actions and/or an entity within the enterprise for use in connection with user-support actions.

20 Claims, 8 Drawing Sheets

(56) References Cited

U.S. PATENT DOCUMENTS

| | | | |
|---|---|---|---|
| 10,893,107 B1* | 1/2021 | Callari | G06K 9/6231 |
| 2009/0260053 A1 | 10/2009 | Kolz et al. | |
| 2014/0068053 A1* | 3/2014 | Ravi | G06F 9/5072 |
| | | | 709/224 |
| 2015/0180714 A1* | 6/2015 | Chunn | H04L 41/084 |
| | | | 709/221 |
| 2016/0041788 A1 | 2/2016 | Lee et al. | |
| 2018/0329935 A1 | 11/2018 | Mugali et al. | |
| 2018/0349366 A1 | 12/2018 | Baranowsky | |
| 2019/0073137 A1 | 3/2019 | Vansteenkiste et al. | |
| 2019/0121889 A1 | 4/2019 | Gold et al. | |
| 2019/0188025 A1 | 6/2019 | Anderson et al. | |
| 2019/0222594 A1* | 7/2019 | Davis, III | H04L 63/1416 |
| 2020/0134083 A1 | 4/2020 | Elliman et al. | |
| 2020/0195517 A1* | 6/2020 | Manthena | H04L 41/22 |
| 2021/0021469 A1* | 1/2021 | Sondur | H04L 41/16 |
| 2021/0027316 A1* | 1/2021 | Thakkar | G06Q 10/1091 |

OTHER PUBLICATIONS

Wikipedia, Apriori algorithm, https://en.wikipedia.org/w/index.php?title=Apriori_algorithm&oldid=887901450, Mar. 15, 2019.

* cited by examiner

FIG. 1

FIG. 2 x ---> High Performing storage Systems across all users (c1,c2......cn)   x = [x1,x2...xn]
y ---> Normal Performing Storage Systems across all users (c1,c2.......cn) y = [y1,y2,...yn]
z ---> Below Normal Performing Storage Systems across all users (c1,c2,......cn) z = [z1,z2...zn]

In the above, x1 represents one of the storage systems for a user c1 for each x, y and z,
    extract system features [fx1,fx2 ......fxn], [fy1,fy2 ......fyn],[fz1,fz2 ......fzn], respectively Then,
for each user & (x,y,z),
    group the features into three buckets b1,b2,b3

E.g., b1 contains all features of high performing storage system for user c1.

Then merge b1,b2,b3 across all users into B1, B2, B3 (e.g., B1 contains features used in high performing systems across all users).

Apply apriori algorithm for each of B1, B2, B3 to derive association rules.

Pseudo-code:
    Ck: Candidate itemset of size k
    Lk : frequent itemset of size k
    L1 = {frequent items};
    for(k = 1;Lk !=∅; k++) do begin
        Ck+1 = candidates generated from Lk;
        for each transaction t in database do
            increment the count of all candidates in Ck+1 that are contained in t
        Lk+1 = candidates in Ck+1 with min_support
    end
    return uk Lk;

Using recommendation algorithm, such as content based filtering, recommendation for each of x, y, and z can be generated.

FIG. 3

| Name | Operating Environment (OE) Version | Recommendation(s) |
|---|---|---|
| Storage System 4 | 4.5 | - No recommendations for Storage System 4. |
| Storage System 5 | 4.4 | - Upgrade OE version to the latest version. (60% of users are using the latest version.)<br>- Enable snapshots for improved data protection. (36% of users are using snapshots.)<br>- Enable replication for improved data protection. (45% of users are using replication.) |
| Storage System 6 | 4.4 | - Upgrade OE version to the latest version. (60% of users are using the latest version.)<br>- Enable compression for better storage efficiency. (25% of users are using compression.) |

| Rating | Name | Replication | Snapshots | Data Reduction | Recommendation(s) |
|---|---|---|---|---|---|
| Silver | Storage System 1 | No | No | No | - Upgrade OE version to the latest version.<br>- Increase disk count for improved performance. |
| Silver | Storage System 2 | No | Yes | No | - Upgrade OE version to the latest version.<br>- Add Flash drive. |
| Gold | Storage System 3 | No | Yes | No | - Upgrade OE version to the latest version. |
| Platinum | Storage System 4 | Yes | Yes | Yes | - No recommendations. |
| Platinum | Storage System 5 | No | Yes | Yes | - Upgrade OE version to the latest version.<br>- Enable snapshots for improved data protection.<br>- Enable replication for improved data protection. |
| Platinum | Storage System 6 | Yes | No | No | - Upgrade OE version to the latest version.<br>- Enable compression for better storage efficiency. |

MACHINE LEARNING-BASED RECOMMENDATION ENGINE FOR STORAGE SYSTEM USAGE WITHIN AN ENTERPRISE

CROSS-REFERENCE TO RELATED APPLICATIONS

The present application is related to U.S. patent application Ser. No. 16/527,269, entitled "Classification of Storage Systems and Users Thereof Using Machine Learning Techniques," filed concurrently herewith and incorporated by reference herein.

FIELD

The field relates generally to information processing systems, and more particularly to techniques for processing storage system data in such systems.

BACKGROUND

Enterprises and other organizations commonly include large numbers of storage systems and users associated therewith. Accordingly, enterprise databases related to the monitoring and analysis of such storage systems can include significant amounts of configuration and operations data. However, conventional storage system monitoring and analysis approaches face challenges in determining and providing proactive recommendations across different storage systems and storage system users.

SUMMARY

Illustrative embodiments of the disclosure provide techniques for implementing a machine learning-based recommendation engine for storage system usage within an enterprise. An exemplary computer-implemented method includes processing input data pertaining to multiple storage systems within an enterprise, and determining one or more association rules applicable to at least a portion of the multiple storage systems by applying one or more machine learning techniques to the processed input data. Such a method also includes generating at least one configuration-related recommendation applicable to one or more of the multiple storage systems by applying one or more content filtering techniques to the one or more determined association rules. Further, such a method includes outputting, via one or more user interfaces, the at least one configuration-related recommendation to one or more of a user for use in connection with one or more storage system configuration actions and an entity within the enterprise for use in connection with one or more user-support actions.

Illustrative embodiments can provide significant advantages relative to conventional storage system monitoring and analysis approaches. For example, challenges associated with determining and providing proactive recommendations to storage system users are overcome through the application of machine learning algorithms to storage system data to learn association rules across the storage systems. In one or more embodiments, such association rules are then utilized to generate configuration-related recommendations for one or more storage systems.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
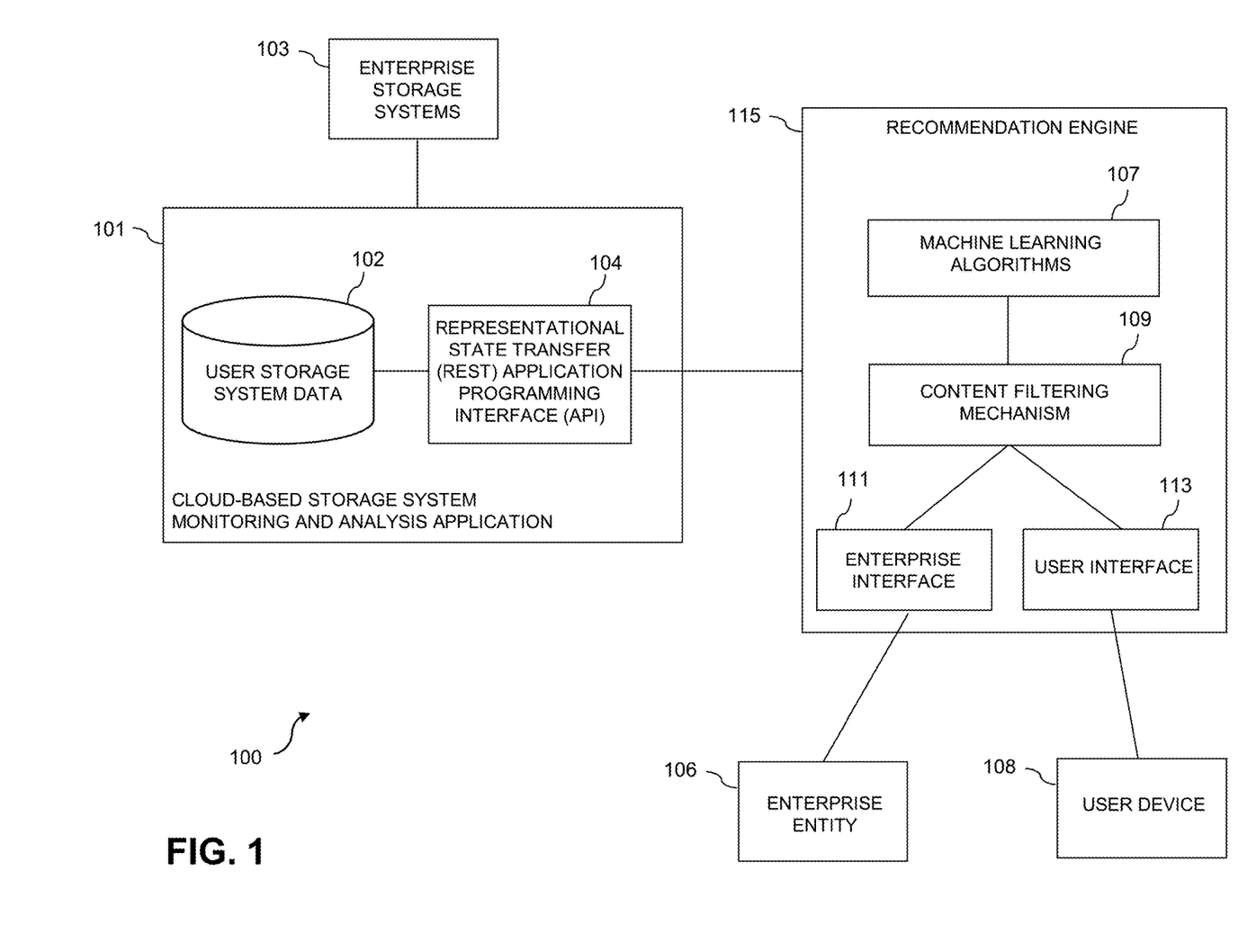
FIG. 1 shows an information processing system configured for implementing a machine learning-based recommendation engine for storage system usage within an enterprise in an illustrative embodiment.

FIG. 1 shows a computer network (also referred to herein as an information processing system) 100 configured in accordance with an illustrative embodiment. The computer network 100 comprises a cloud-based storage system monitoring and analysis application 101, which interacts with enterprise storage systems 103 and includes a user storage system data database 102 and a representational state transfer (REST) application programming interface (API) 104. Additionally, the computer network 100 also comprises a recommendation engine 115, which includes machine learning algorithms 107, content filtering mechanism 109, an enterprise interface 111 and a user interface 113. In at least one embodiment, the cloud-based storage system monitoring and analysis application 101 is coupled to the recommendation engine 115 via a network, wherein the network in such an embodiment is assumed to represent a sub-network or other related portion of the larger computer network 100. As also depicted in FIG. 1, the computer network 100 comprises at least one enterprise entity 106 and at least one user device 108, which can be coupled to the recommendation engine 115 as well.

It is to be appreciated that the term "user" in this context and elsewhere herein is intended to be broadly construed so as to encompass, for example, human, hardware, software or firmware entities, as well as various combinations of such entities. For example, a user may comprise, for example, mobile telephones, laptop computers, tablet computers, desktop computers or other types of computing devices. Such users in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Such a network is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, in one or more embodiments, each recommendation engine 115 is assumed to be implemented using at least one processing device. Each such processing device generally comprises at least one processor and an associated memory, and implements one or more functional modules for controlling certain features of the recommendation engine 115.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

It is to be appreciated that the particular arrangement of the machine learning algorithms 107, the content filtering mechanism 109, the enterprise interface 111 and the user interface 113 illustrated in the recommendation engine 115 of the FIG. 1 embodiment is presented by way of example only, and alternative arrangements can be used in other embodiments. For example, the functionality associated with the modules 107, 109, 111 and 113 in other embodiments can be combined into a single module, or separated across a larger number of modules. As another example, multiple distinct processors can be used to implement different ones of the modules 107, 109, 111 and 113 or portions thereof.

It is to be understood that the particular set of elements shown in FIG. 1 for classifying storage systems and users thereof using machine learning techniques involving cloud-based storage system monitoring and analysis application 101 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing modules 107, 109, 111 and 113 of example recommendation engine 115 in computer network 100 will be described in more detail with reference to the flow diagram of FIG. 6.

Accordingly, at least one embodiment of the invention includes implementing a machine learning-based recommendation engine for storage system usage within an enterprise. Such an embodiment includes converting one or more storage systems into one or more market baskets, thereby enabling insights regarding system configuration, enabled and/or disabled features, etc., which can be used to classify, cluster and/or group each such storage system. As used herein, market basket analysis refers to a modelling technique based upon a theory that if an individual obtains or buys a certain group of items, then that individual is more (or less) likely to obtain or buy another group of items. Additionally, such an embodiment also includes applying an apriori algorithm to analyze one or more association rules and frequent item sets, which can be provided as input to a recommendation engine (such as engine 115 in FIG. 1, for example), which can then generate one or more meaningful recommendations pertaining to, for example, improving storage system efficiency and reducing total cost of ownership.

Additional input data utilized by and/or in connection with such a recommendation engine can include storage system configuration data, storage system operations data, heuristic-based health scores (attributed to storage systems and/or users), user service request count information, etc. Such input data can be, in at least one embodiment, processed via feature engineering techniques including cleaning of the data, imputing missing data, converting numerical data to categorical data, etc. Such feature engineering techniques can be performed, for example, on a given collection of historical input data (e.g., the last six months of data).

Also, in at least one embodiment, market basket analysis association rule mining is performed on such processed input data to determine and/or learn relationships between different storage system configurations. In such an embodiment, based at least in part on support for a specific system configuration and confidence scores (which indicate the likely use of a specific feature), the top-k association rules are identified and/or selected. Additionally, an antecedent configuration as well as a consequent configuration, together with one or more lift scores, can be fed to the recommendation engine, which can apply a content filtering mechanism (such as module 109 in FIG. 1, for example) to generate a recommendation score and rank.

As used herein, a lift refers to an association rule, wherein the lift value is a measure of importance of the rule. Rules with higher lift scores indicate a strong association between two items. For example, if a given rule has a lift score of one, that score would imply that the probability of occurrence of the antecedent and occurrence of the consequent are independent of each other. When two events are independent of each other, no rule can be drawn involving those two events. By way of additional example, if the lift score is greater than one, that score would indicate the degree to which those two occurrences are dependent on one another, rendering those rules potentially useful for predicting the consequent in future data sets. Also, in such an embodiment, if the lift score is less than one, that score would indicate that the rules can be substituted for one another, meaning that the presence of one rule has a negative effect on the presence of other rule, and vice versa. The value of a lift score includes the consideration of both the support of the rule and the overall data set.

Additionally, in accordance with at least one embodiment, a recommendation is generated in connection with a user, one or more items, and a rank. More specifically, in one or more embodiments, for each user, a number of items with a specified ranking can be recommended. For example, assume there are 20 items for a user, but it is desired that only five such items are recommended to the user. Accordingly, in such an embodiment, a ranking will facilitate the selection of the top five items to be recommended to the user.

Accordingly, one or more embodiments include applying such a content filtering mechanism to multiple storage systems to generate and provide a comprehensive list of recommendations related to storage system configurations. In at least one embodiment, content-based filtering methods are based at least in part on a description of the item and a profile of the user's preferences. Such methods are suited to situations, for example, wherein there is known data on an item (a name, a location, a description, etc.) but not on the user. Content-based recommendation methods can treat a recommendation as a user-specific classification problem and learn a classifier for the user's likes and dislikes based at least in part on one or more product features. As such, in an example embodiment, an item can include a storage system feature, and the user can include the user of the storage system.

Also, such recommendation information can be displayed via one or more interfaces (such as enterprise interface 111 and/or user interface 113 in FIG. 1) and/or via one or more enterprise or user portals. When presented via an enterprise interface and/or a user-support portal, enterprise (support) personnel are enabled to provide one or more notes and/or comments related to historical and contextual information pertaining to the user(s) in question. When presented via a user interface, the user may opt out of receiving recommendations for one or more particular storage systems, or may opt out of receiving certain types of recommendations.

Figure 2:
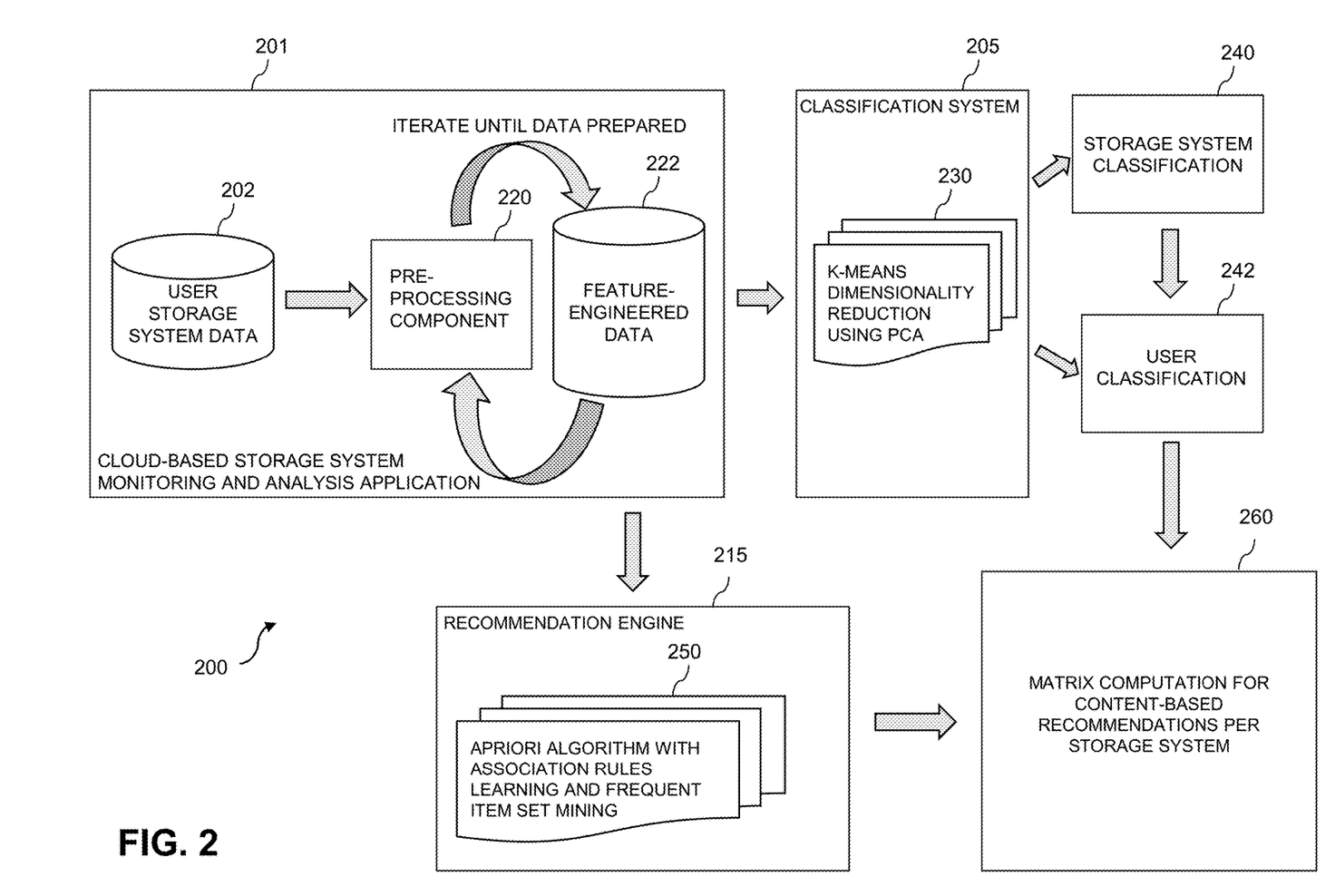
FIG. 2 shows an example workflow for implementing a machine learning-based recommendation engine for storage system usage within an enterprise in an illustrative embodiment.

FIG. 2 shows an example workflow for implementing a machine learning-based recommendation engine for storage system usage within an enterprise in an illustrative embodiment. By way of illustration, FIG. 2 depicts a computer network 200 configured in accordance with an illustrative embodiment. The computer network 200 comprises cloud-based storage system monitoring and analysis application 201, which includes user storage system data database 202, a pre-processing component 220 and a feature-engineered data database 222. As depicted, the pre-processing component 220 iterates over one or more portions of the data contained within database 202 until sufficient feature-engineered data is prepared.

Additionally, the computer network 200 also comprises classification system 205, which processes feature-engineered data provided by cloud-based storage system monitoring and analysis application 201 via k-means dimensionality reduction using PCA 230. Further, based at least in part on the module 230 processing, the classification system 205 generates and outputs a storage system classification 240 and a user classification 242 (which is generated based in part on the storage system classification 240). In one or more embodiments the storage system classification 240 provides a view (e.g., via at least one interface) to the user(s) and/or enterprise entity (e.g., support personnel) as to how effectively each of the storage systems has performed in relation to at least a portion of the rest of the storage systems of all other users in the enterprise. Also, in such an embodiment, the user classification 242 provides a means (e.g., via at least one interface) for a given user and/or enterprise entity (e.g., support personnel) to determine the given user's overall performance in relation to at least a portion of all other users within the enterprise.

Further, the computer network 200 also comprises recommendation engine 215, which processes feature-engineered data provided by cloud-based storage system monitoring and analysis application 201 via an apriori algorithm 250 with association rules learning and frequent item set mining. Based at least in part of the apriori algorithm 250 processing, the recommendation engine 215 generates and outputs a matrix computation 260 for content-based recommendations per storage system. Also, as depicted in FIG. 2, the matrix computation 260 is based at least in part on the user classification 242 as well. For example, such a matrix, in one or more embodiments, presents which users are using which feature(s), and the value in each matrix cell can represent a rating. In an example embodiment, a higher rating indicates a highly-performing system feature. Additionally, based at least in part on the ratings contained with such a matrix, one or more recommendations can be generated for one or more of the users via implementation of one or more machine learning algorithms (such as further detailed herein).

Figure 3:
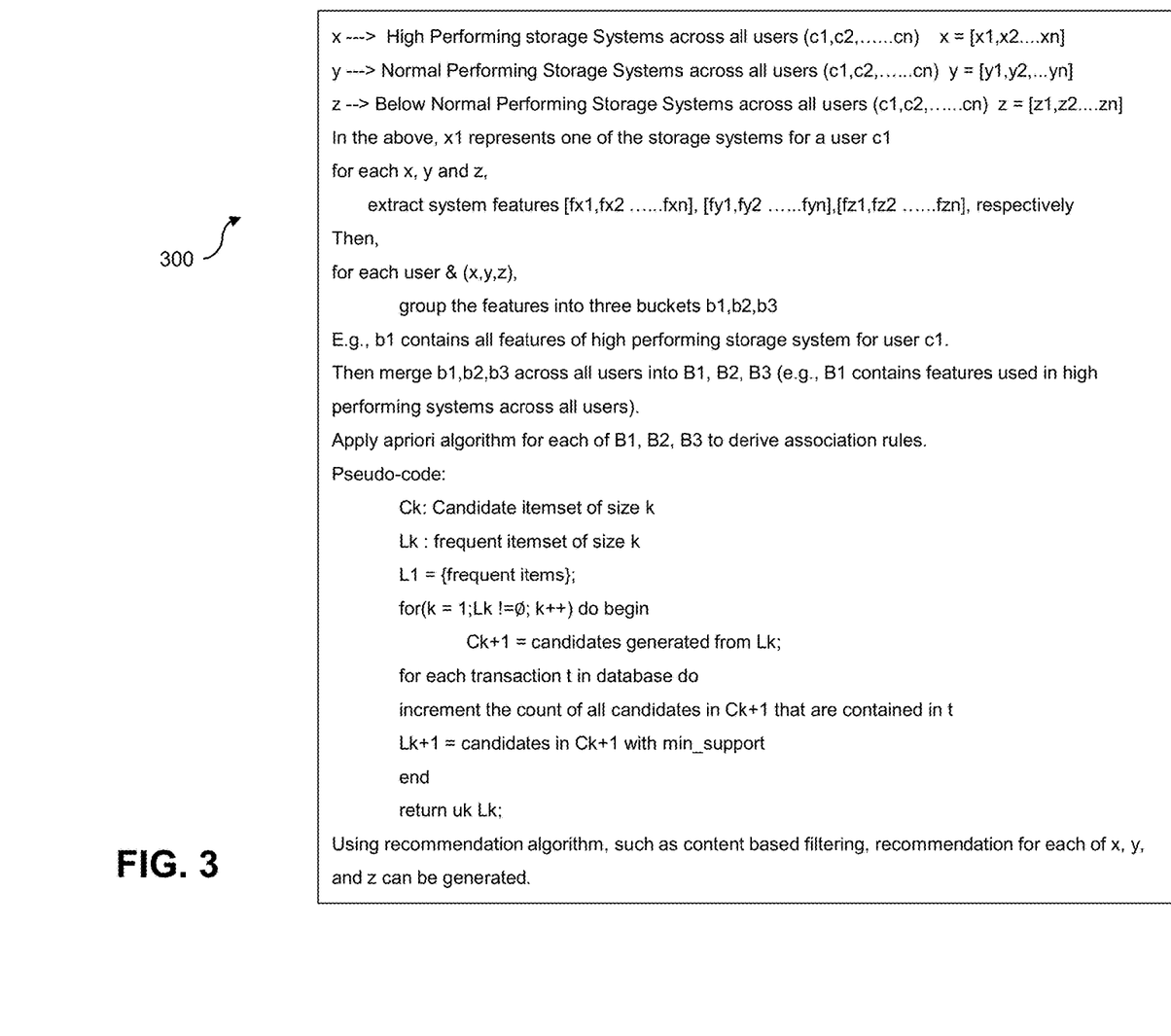
FIG. 3 shows example pseudocode for implementing a cross-user recommendation engine for storage systems in an illustrative embodiment.

FIG. 3 shows example pseudocode for implementing a cross-user recommendation engine for storage systems in an illustrative embodiment. In this embodiment, pseudocode 300 is executed by or under the control of a processing system, such as recommendation engine 115, or another type of processing system. For example, the pseudocode 300 may be viewed as comprising a portion of a software implementation of at least part of machine learning algorithms 107 and content filtering mechanism 109 of the FIG. 1 embodiment.

The pseudocode 300 illustrates steps for segmenting system features into categories (e.g., great, good, and average) using performance data for all systems and for all relevant users. From such segmentation, a matrix is generated, and based at least in part on the generated matrix, one or more recommendations are determined. By way merely of example, for a user having a low-performing storage system, a list of features to be enabled in his or her system can be recommended.

It is to be appreciated that this particular pseudocode shows just one example implementation of a process for implementing a cross-user recommendation engine for storage systems, and alternative implementations of the process can be used in other embodiments.

Figure 4:
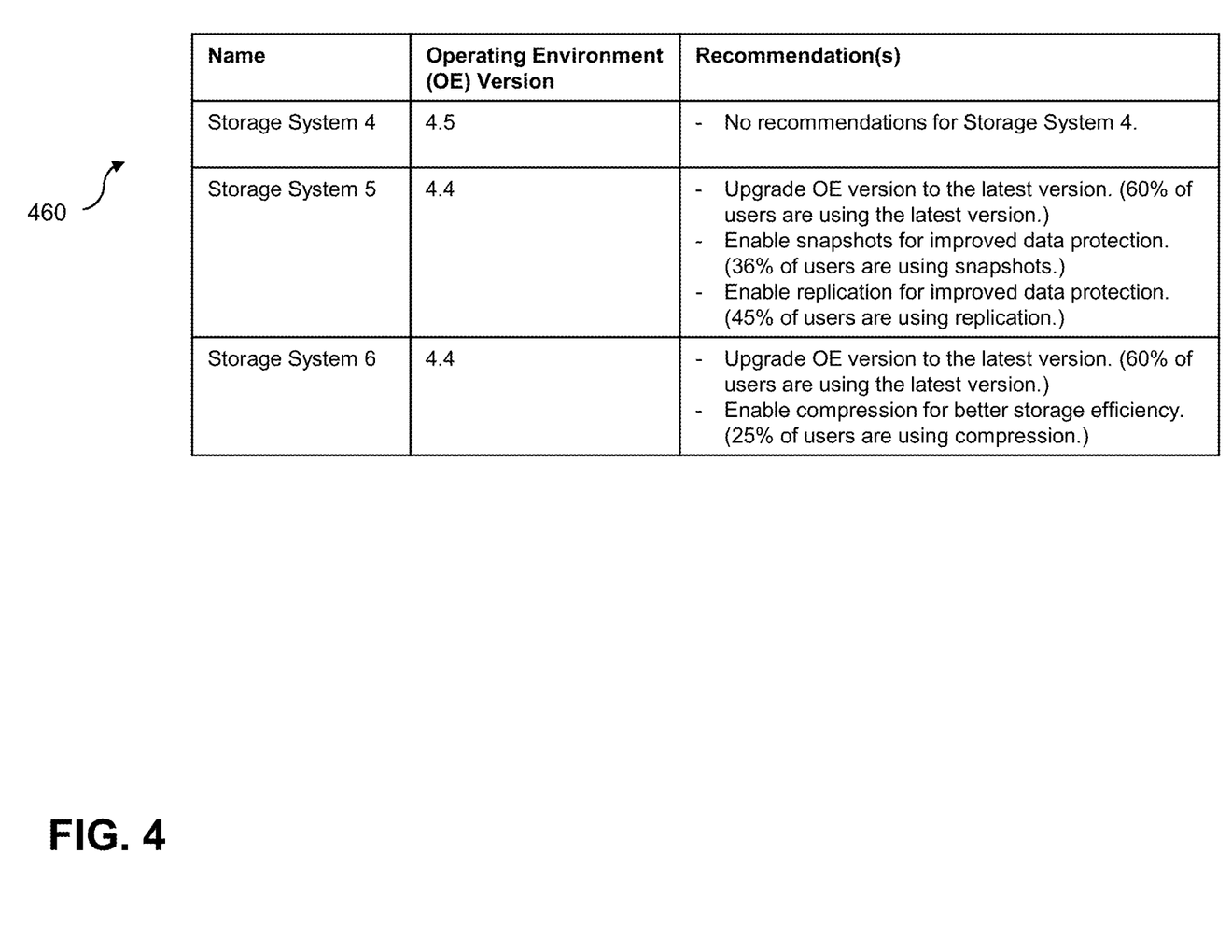
FIG. 4 shows an example user output in an illustrative embodiment.

FIG. 4 shows an example user output in an illustrative embodiment. By way of illustration, FIG. 4 depicts an example matrix 460 that indicates operating environment version and recommendations for particular named storage systems. A matrix such as 460 can, in one or more embodiments, be representative of a storage system classification output (such as 240 in FIG. 1) provided to a user (e.g., user device 108 in FIG. 1) via a user interface (such as interface 113 in FIG. 1).

Figure 5:
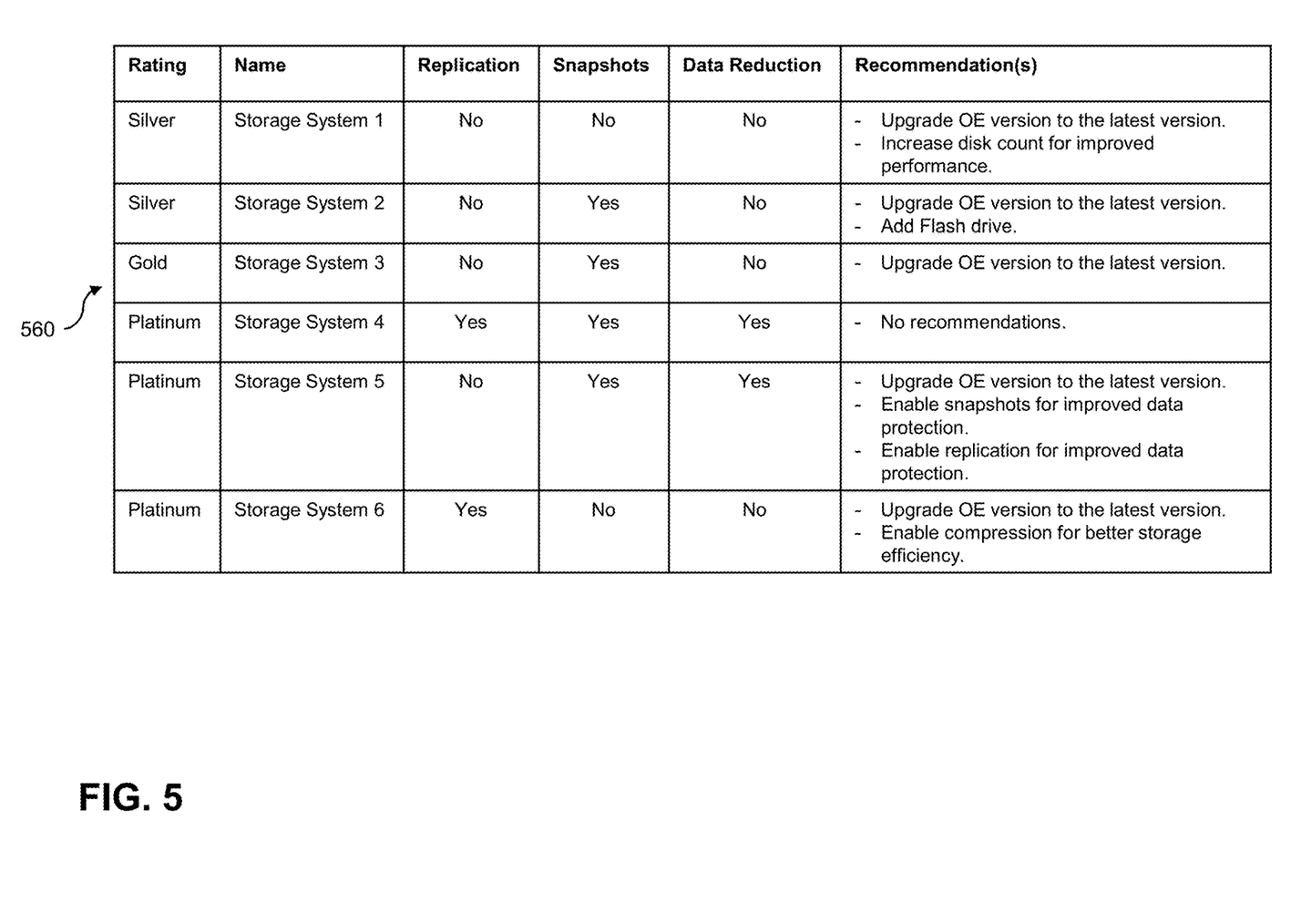
FIG. 5 shows an example enterprise entity output in an illustrative embodiment.

Similarly, FIG. 5 shows an example enterprise entity output in an illustrative embodiment. By way of illustration, FIG. 5 depicts an example matrix 560 that indicates the rating level of and recommendations for particular named storage systems. The matrix 560 additionally indicates a binary status of replication, snapshot, and data reduction functionalities of the respective named storage systems. A matrix such as 560 can, in one or more embodiments, be representative of a storage system classification output (such as 240 in FIG. 1) provided to an enterprise entity (e.g., entity 106 in FIG. 1) via an enterprise interface (such as interface 111 in FIG. 1).

Figure 6:
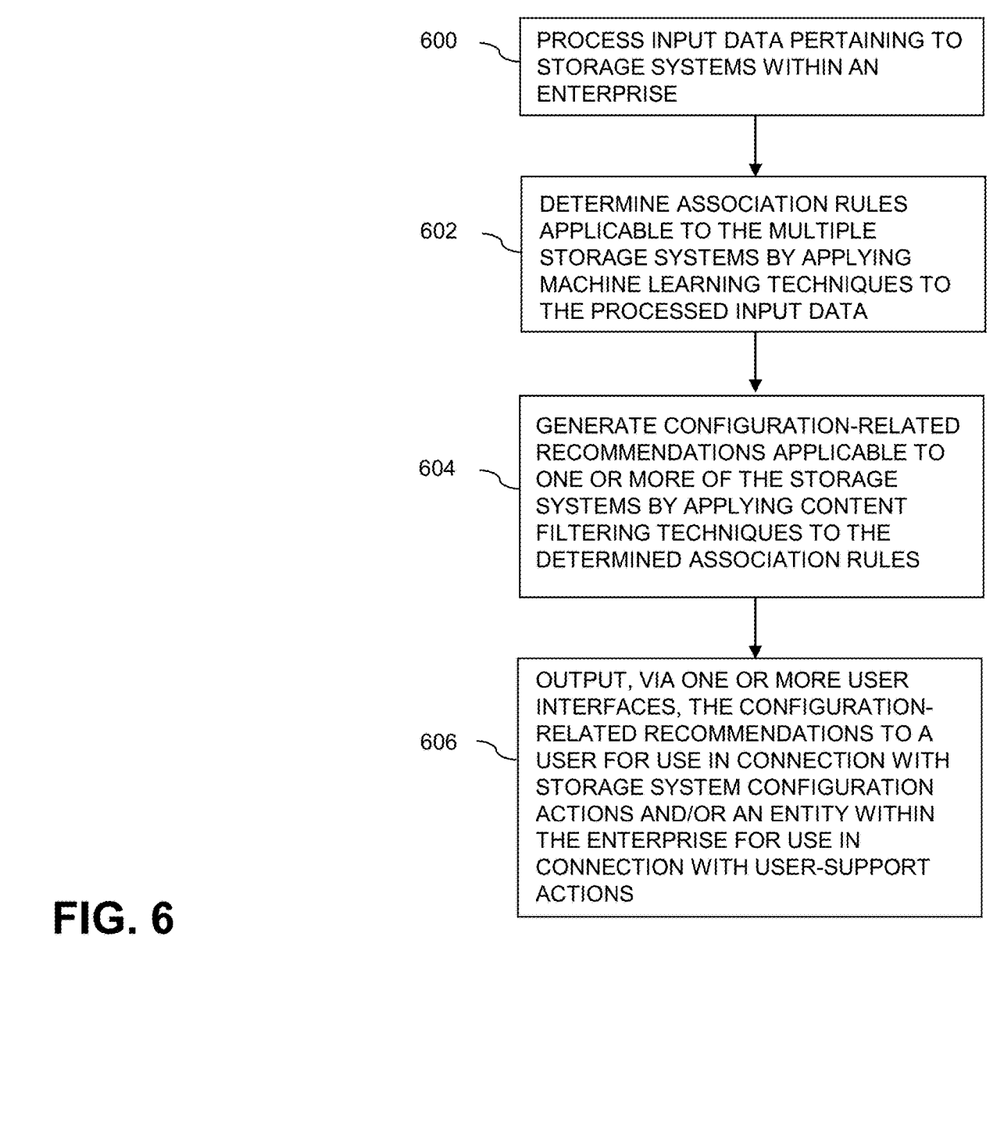
FIG. 6 is a flow diagram of a process for implementing a machine learning-based recommendation engine for storage system usage within an enterprise in an illustrative embodiment.

FIG. 6 is a flow diagram of a process for implementing a machine learning-based recommendation engine for storage system usage within an enterprise in an illustrative embodiment. It is to be understood that this particular process is only an example, and additional or alternative processes can be carried out in other embodiments.

In this embodiment, the process includes steps 600 through 606. These steps are assumed to be performed by the recommendation engine 115 utilizing its modules 107, 109, 111 and 113.

Step 600 includes processing input data pertaining to multiple storage systems within an enterprise. In one or more embodiments, the input data include storage system configuration data associated with the multiple storage systems, storage system operations data associated with the multiple storage systems, storage system heuristic-based health scores associated with the multiple storage systems, user service request counts associated with the multiple storage systems, etc.

Processing the input data can include performing multiple feature engineering steps on the input data. Such feature engineering steps can include, for example, cleaning the input data, imputing one or more items of missing data in the input data, and converting, in the input data, one or more items of numerical data to one or more items of categorical data. Also, in at least one embodiment, processing the input data includes processing a portion of the input data encompassing a given temporal period.

Step 602 includes determining one or more association rules applicable to at least a portion of the multiple storage systems by applying one or more machine learning techniques to the processed input data. Applying the one or more machine learning techniques to the processed input data can include applying at least one market basket analysis technique to the processed input data to determine relationships among storage system configuration data contained within the processed input data. Additionally, in one or more embodiments, determining the one or more association rules is based at least in part on user support values associated with a given storage system configuration and one or more confidence scores related thereto. Also, in at least one embodiment, the one or more machine learning techniques comprises an apriori algorithm.

Step 604 includes generating at least one configuration-related recommendation applicable to one or more of the multiple storage systems by applying one or more content filtering techniques to the one or more determined association rules. Step 606 includes outputting, via one or more user interfaces, the at least one configuration-related recommendation to one or more of a user for use in connection with one or more storage system configuration actions and an entity within the enterprise for use in connection with one or more user-support actions.

The techniques depicted in FIG. 6 can also include automatically configuring at least one of the storage systems by performing at least a portion of the one or more storage system configuration actions, as well as automatically performing at least a portion of the one or more user-support actions by updating at least one data structure associated with one or more users and one or more of the storage structures.

Accordingly, the particular processing operations and other functionality described in conjunction with the flow diagram of FIG. 6 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to apply machine learning algorithms to storage system data to learn association rules across the storage systems. These and other embodiments can effectively generate configuration-related recommendations for one or more of the storage systems.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Services (AWS), Google Cloud Platform (GCP) and Microsoft Azure. Virtual machines provided in such systems can be used to implement at least portions of a computer system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
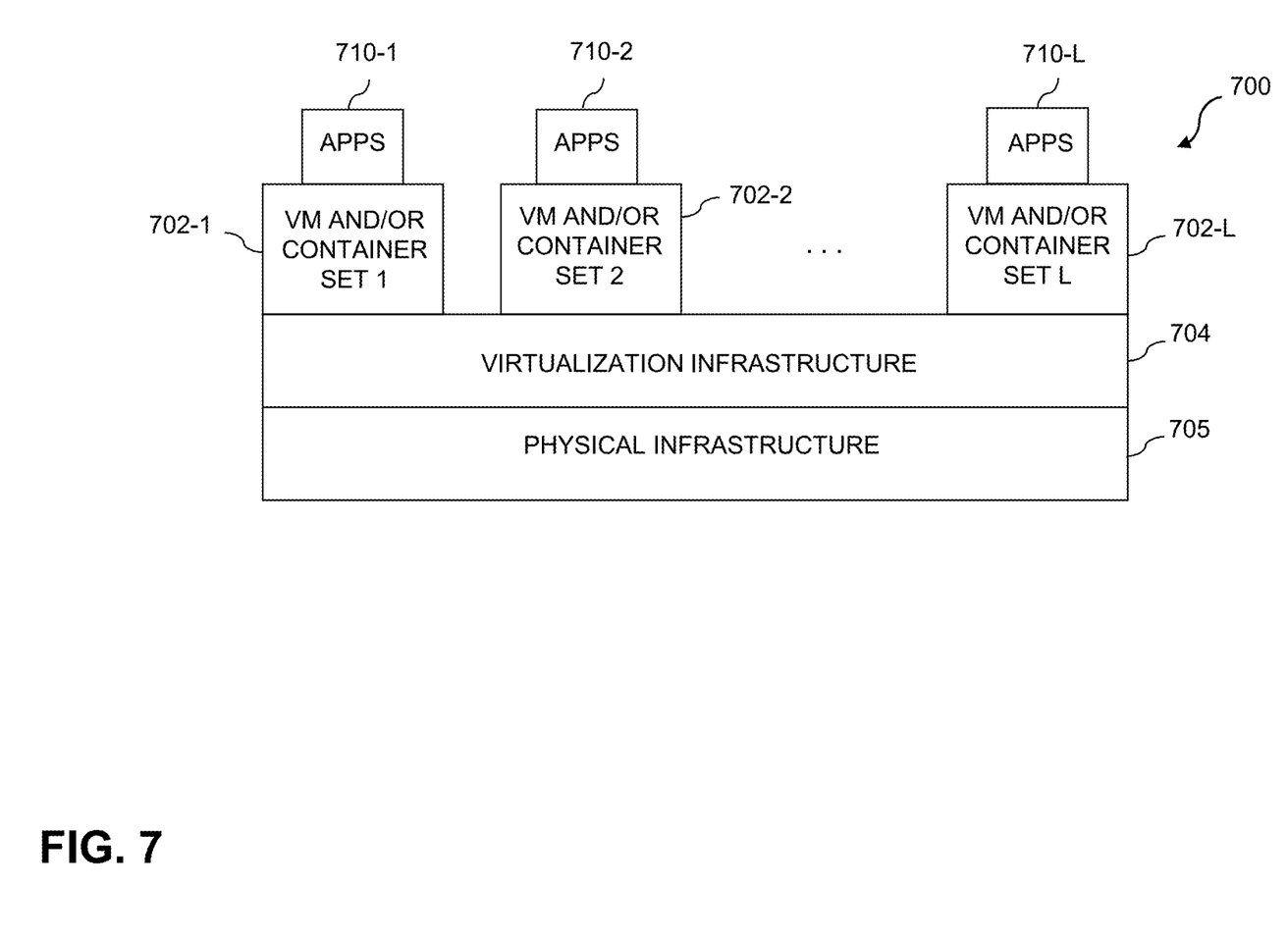
FIGS. 7 and 8 show examples of processing platforms that may be utilized to implement at least a portion of an information processing system in illustrative embodiments.
Figure 8:
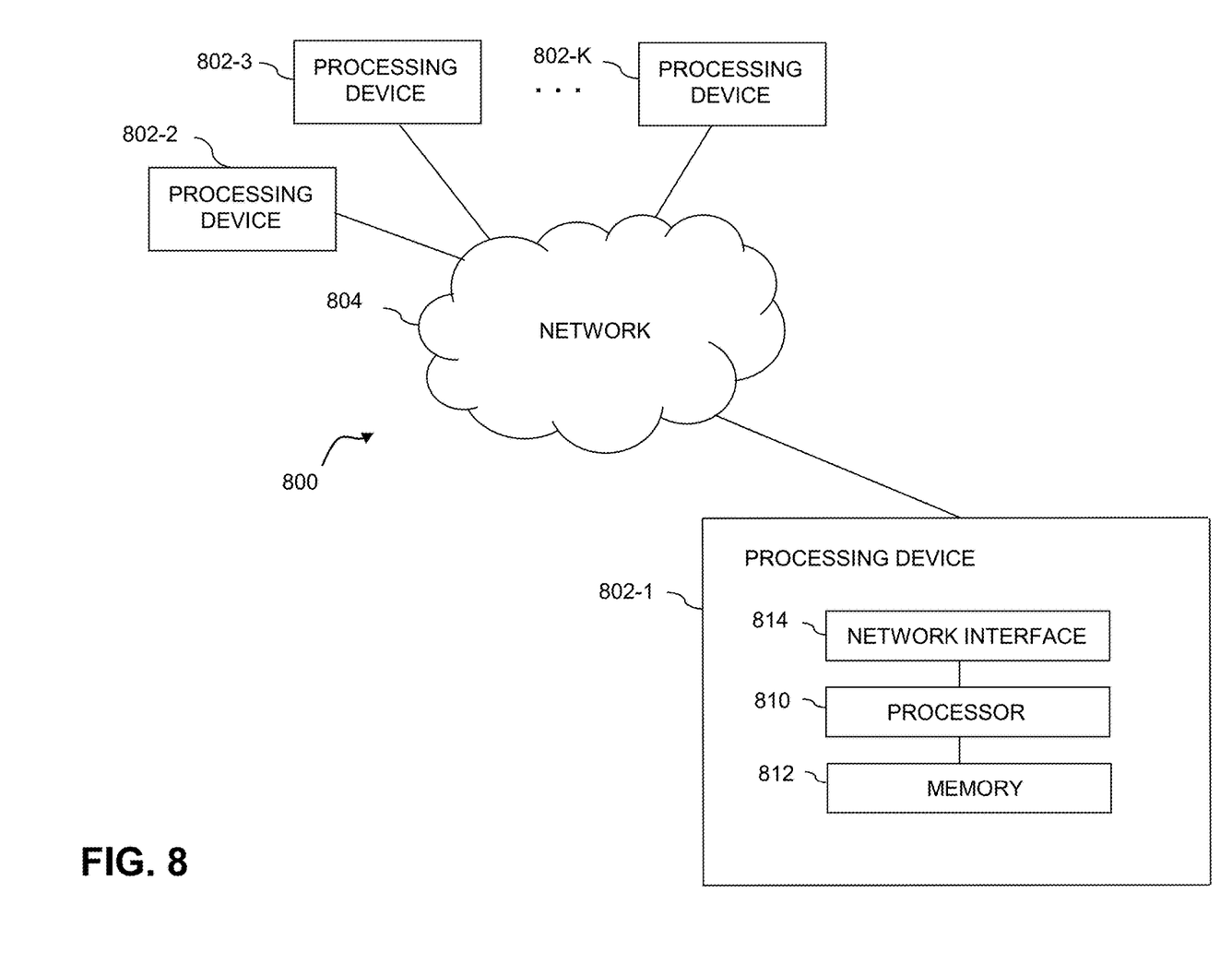

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

An example of a hypervisor platform used to implement a hypervisor within the virtualization infrastructure 704 is the VMware® vSphere® which has an associated virtual infrastructure management system such as the VMware® vCenter™. The underlying physical machines comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a microcontroller, an application-specific integrated circuit (ASIC), a field-programmable gate array (FPGA) or other type of processing circuitry, as well as portions or combinations of such circuitry elements.

The memory 812 comprises random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing platforms, modules, cloud-based systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
processing input data pertaining to multiple storage systems within an enterprise, wherein processing the input data comprises performing feature engineering steps on at least a portion of the input data, the feature engineering steps comprising imputing one or more items of missing data and converting one or more items of numerical data to one or more items of categorical data;
determining one or more association rules applicable to at least a portion of the multiple storage systems by applying one or more machine learning techniques to the processed input data;
generating at least one configuration-related recommendation applicable to one or more of the multiple storage systems by applying one or more content filtering techniques to the one or more determined association rules; and
outputting, via one or more user interfaces, the at least one configuration-related recommendation to one or more of a user for use in connection with one or more storage system configuration actions and an entity within the enterprise for use in connection with one or more user-support actions;
wherein the method is performed by at least one processing device comprising a processor coupled to a memory.

2. The computer-implemented method of claim 1, wherein applying the one or more machine learning techniques to the processed input data comprises applying at least one market basket analysis technique to the processed input data to determine relationships among storage system configuration data contained within the processed input data.

3. The computer-implemented method of claim 2, wherein determining the one or more association rules is based at least in part on user support values associated with a given storage system configuration and one or more confidence scores related thereto.

4. The computer-implemented method of claim 1, wherein the one or more machine learning techniques comprises an apriori algorithm.

5. The computer-implemented method of claim 1, wherein performing the feature engineering steps comprises cleaning at least a portion of the input data.

6. The computer-implemented method of claim 1, wherein processing the input data comprises processing a portion of the input data encompassing a given temporal period.

7. The computer-implemented method of claim 1, wherein the input data comprise storage system configuration data associated with the multiple storage systems.

8. The computer-implemented method of claim 1, wherein the input data comprise storage system operations data associated with the multiple storage systems.

9. The computer-implemented method of claim 1, wherein the input data comprise storage system heuristic-based health scores associated with the multiple storage systems.

10. The computer-implemented method of claim 1, wherein the input data comprise user service request counts associated with the multiple storage systems.

11. The computer-implemented method of claim 1, further comprising:
automatically configuring at least one of the storage systems by performing at least a portion of the one or more storage system configuration actions.

12. The computer-implemented method of claim 1, further comprising:
automatically performing at least a portion of the one or more user-support actions by updating at least one data structure associated with one or more users and one or more of the storage structures.

13. A non-transitory processor-readable storage medium having stored therein program code of one or more software programs, wherein the program code when executed by at least one processing device causes the at least one processing device:
to process input data pertaining to multiple storage systems within an enterprise, wherein processing the input data comprises performing feature engineering steps on at least a portion of the input data, the feature engineering steps comprising imputing one or more items of missing data and converting one or more items of numerical data to one or more items of categorical data;
to determine one or more association rules applicable to at least a portion of the multiple storage systems by applying one or more machine learning techniques to the processed input data;
to generate at least one configuration-related recommendation applicable to one or more of the multiple storage systems by applying one or more content filtering techniques to the one or more determined association rules; and
to output, via one or more user interfaces, the at least one configuration-related recommendation to one or more of a user for use in connection with one or more storage system configuration actions and an entity within the enterprise for use in connection with one or more user-support actions.

14. The non-transitory processor-readable storage medium of claim 13, wherein applying the one or more machine learning techniques to the processed input data comprises applying at least one market basket analysis technique to the processed input data to determine relationships among storage system configuration data contained within the processed input data.

15. The non-transitory processor-readable storage medium of claim 14, wherein determining the one or more association rules is based at least in part on user support values associated with a given storage system configuration and one or more confidence scores related thereto.

16. The non-transitory processor-readable storage medium of claim 13, wherein the one or more machine learning techniques comprises an apriori algorithm.

17. An apparatus comprising:
at least one processing device comprising a processor coupled to a memory;
the at least one processing device being configured:
to process input data pertaining to multiple storage systems within an enterprise, wherein processing the input data comprises performing feature engineering steps on at least a portion of the input data, the feature engineering steps comprising imputing one or more items of missing data and converting one or more items of numerical data to one or more items of categorical data;
to determine one or more association rules applicable to at least a portion of the multiple storage systems by applying one or more machine learning techniques to the processed input data;
to generate at least one configuration-related recommendation applicable to one or more of the multiple storage systems by applying one or more content filtering techniques to the one or more determined association rules; and
to output, via one or more user interfaces, the at least one configuration-related recommendation to one or more of a user for use in connection with one or more storage system configuration actions and an entity within the enterprise for use in connection with one or more user-support actions.

18. The apparatus of claim 17, wherein applying the one or more machine learning techniques to the processed input data comprises applying at least one market basket analysis technique to the processed input data to determine relationships among storage system configuration data contained within the processed input data.

19. The apparatus of claim 18, wherein determining the one or more association rules is based at least in part on user support values associated with a given storage system configuration and one or more confidence scores related thereto.

20. The apparatus of claim 17, wherein the at least one processing device is further configured:
to automatically configure at least one of the storage systems by performing at least a portion of the one or more storage system configuration actions.

* * * * *